United States Patent
Calver et al.

(10) Patent No.: US 6,511,767 B1
(45) Date of Patent: Jan. 28, 2003

(54) CARBON BASED ELECTRODES

(75) Inventors: Timothy James Calver, Abingdon (GB); Stewart Ernest Male, East Grinstead (GB); Philip John Mitchell, Loughborough (GB); Ian Whyte, Milton Keynes (GB)

(73) Assignee: Regenesys Technologies Limited, Wiltshire (GB)

( * ) Notice: Subject to any disclaimer, the term of this patent is extended or adjusted under 35 U.S.C. 154(b) by 0 days.

(21) Appl. No.: 09/674,847

(22) PCT Filed: May 5, 1999

(86) PCT No.: PCT/GB99/01396

§ 371 (c)(1), (2), (4) Date: May 24, 2001

(87) PCT Pub. No.: WO99/57775

PCT Pub. Date: Nov. 11, 1999

(30) Foreign Application Priority Data

May 7, 1998 (GB) .............................................. 9809773

(51) Int. Cl.$^7$ .............................. H01M 4/96; H01M 4/88
(52) U.S. Cl. .......................... 429/42; 429/44; 502/101
(58) Field of Search ........................... 429/42, 44, 105, 429/210; 502/101

(56) References Cited

U.S. PATENT DOCUMENTS

| | | |
|---|---|---|
| 3,920,474 A | 11/1975 | Zito |
| 4,069,371 A | 1/1978 | Zito |
| 4,177,204 A | 12/1979 | Mageli et al. |
| 4,818,741 A * | 4/1989 | Herscovici .................. 502/101 |
| 4,966,675 A * | 10/1990 | Steininger .................. 429/44 X |
| 5,098,617 A | 3/1992 | Schuster |
| 5,851,694 A * | 12/1998 | Miyabayashi et al. ...... 429/105 |
| 6,010,606 A * | 1/2000 | Denton et al. ............. 429/42 X |
| 6,103,413 A * | 8/2000 | Hinton et al. ........... 429/210 X |

FOREIGN PATENT DOCUMENTS

| | | |
|---|---|---|
| EP | 100548 | 2/1984 |
| EP | 126511 | 11/1984 |
| EP | 268397 | 5/1988 |
| EP | 767505 | 4/1997 |
| FR | 2404312 | 4/1979 |
| GB | 931732 | 7/1963 |
| GB | 1094914 | 12/1967 |
| GB | 1224007 | 3/1971 |
| GB | 1373711 | 11/1974 |
| GB | 1392353 | 4/1975 |
| WO | 9406164 | 3/1994 |
| WO | 9410525 | 4/1994 |

OTHER PUBLICATIONS

Oxygen–Reducing Porous Carbon Electrode For Electrochemical Power Sources With Alkaline Electrolytes, XP–002087375, Manoharan, Solid State and Structural Chemistry Unit, Indian Institute of Sci nce May 28, 1983, Journal of Power Sources.

* cited by examiner

Primary Examiner—Stephen Kalafut
(74) Attorney, Agent, or Firm—Antonelli, Terry, Stout & Kraus, LLP

(57) ABSTRACT

A carbon based electrode for the electrochemical reduction of sulfur or oxygen, which comprises an electrode core and, in electrical contact therewith, a structure comprising a porous particulate activated carbon bonded with a polymeric binder material, characterised in that the structure is at least 1 mm thick, in that the particulate activated carbon is prepared from a lignocellulosic material and has the following properties: i) a particle size in the range of from 200 to 850 $\mu$m; ii) a pore volume of from 0.45 to 1.0 cm$^3$ per gram; iii) a surface area in the range of from 800 to 1500 m$^2$/g; and in that the binder is used in an amount not exceeding 25% by weight based upon the mixture of activated carbon and binder material.

23 Claims, 1 Drawing Sheet

CARBON BASED ELECTRODES

BACKGROUND OF THE INVENTION (1) Field of the Invention

The present invention relates to carbon, based electrodes and, in particular, to carbon based electrodes for the electrochemical reduction of sulfur or oxygen.

(2) Description of Related Art

It is well known in the electrochemical field that carbon is not an electrocatalyst for the reduction of sulfur (Allen, P. L. and Hickling, A., Trans. Faraday Soc., 53 (1957) 1626). Various workers have endeavoured to find good elecrocatalysts for the reduction of sulfur which enable the electrode to operate at a current density of greater than 20 mAcm$^{-2}$ at an over potential of less than 50 mV. To date the only materials which have been found to be sufficiently active are metal sulfides. However, the materials with the highest activity do not show good long term stability and are expensive to produce.

A separate problem occurs when carrying out the sulfide/polysulfide redox reduction which is described, for example, in U.S. Pat. No. 4,485,154. The current density at an electrode carrying out the sulfide/polysulfide redox reaction is limited by the combined effects of the reactions in solution and slow electrochemical reaction kinetics. Many authors (Lessner, P. M., McLaron, F. R., Winnick, J. and Cairns, E.J., J. Appl. Electrochem., 22 (1996) 927–934, Idem., ibid. 133 (1986) 2517) have proposed a metal or metal sulfide deposited on a high surface area electrode (e.g. an expanded metal mesh) to overcome these effects by providing a high interfacial area per unit volume and an electrocatalyst surface. The catalytic electrode surface layers of Ni, Co or Mo metals, or the sulfides of these metals, achieve only a modest current density of 10 to 20 mAcm$^{-2}$ at an over voltage of 50 mV.

Electrodes which are surfaced with carbon are recognized to be two to three orders of magnitude worse than the catalytic electrode surface layers of Ni, Co or Mo metals, or the sulfides of these metals. Accordingly, a 50 mV overvoltage would be achieved only at current densities of 0.1 to 1 mAcm$^{-2}$. For example, overvoltagaes of 300 to 500 mV are encountered at 40 mAcm$^{-2}$ even when the electrode surface is coated with a high surface area carbon (see U.S. Pat. No. 4,069,371 and U.S. Pat. No. 4,177,204).

It would be advantageous to be able to use carbon based electrodes for the electrochemical reduction of sulfur in the sulfide/polysulfide redox energy storage system because a carbon based electrode would not suffer from degradation due to inter-conversion between various sulfide phases. We have now developed a technique for making carbon based electrodes which are electrocatalytically active for the sulfur reduction process. Such electrodes are also suitable for the electrochemical reduction of oxygen.

SUMMARY OF THE INVENTION

Accordingly, the present invention provides a carbon based electrode for the electrochemical reduction of sulfur or oxygen, which comprise an electrode core and, in electrical contact therewith, a structure comprising a porous particulate activated carbon bonded with a polymeric binder material, characterised in that the structure is at least 1 mm thick, in that the particulate activated carbon is prepared from a lignocellulosic material and has the following properties:

i) a particle size in the range of from 200 to 850 μm;

ii) a pore volume of from 0.45 to 1.0 cm$^3$ per gram;

iii) a surface area in the range of from 800 to 1500 m$^2$/g;

and in that the binder is used in an amount not exceeding 25% by weight based upon the mixture of activated carbon and binder material.

DETAILED DESCRIPTION OF THE INVENTION

Figure 1:
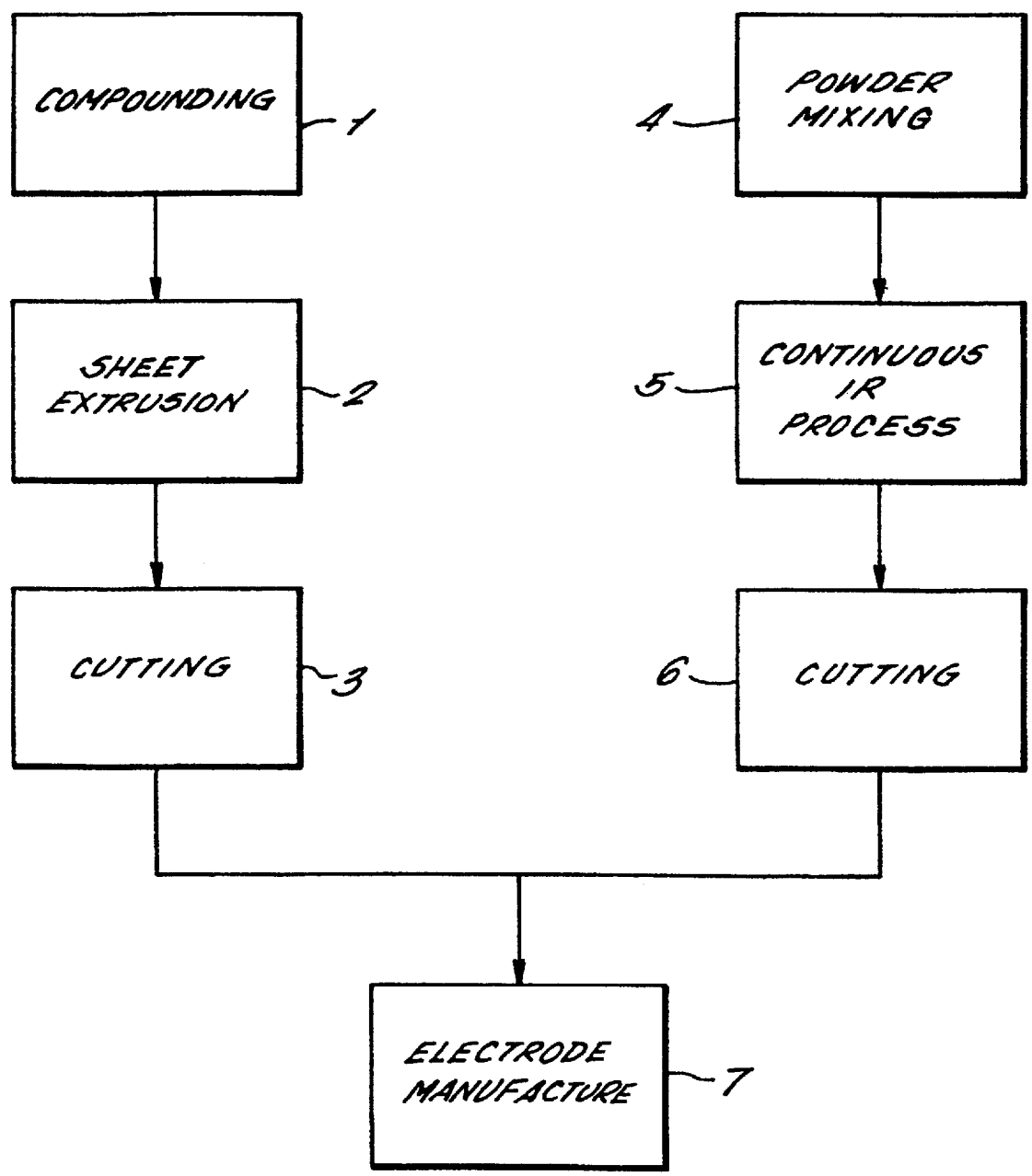
FIG. 1 is a schematic representation of the process for the production of a carbon based electrode.

The activated carbon which is used in the present invention is prepared from a lignocellulosic material such as nut shells or fruit stones. The activated carbon may be prepared by oxidising nut shells or fruit stones by contact with an oxidising acid at an elevated temperature to produce an intermediate product which is then carbonised to give the activated carbon according to the teaching of EP-A-0395353. Another method of preparing the activated carbon used in the present invention is by the steam activation of a carbonised product prepared from a lignocellulosic material. The activation method is known in the art and is generally carried out at a temperature of from 600 to 1000° C. A further method of activating carbon, which is well known in the art, is the air activation method which also produces an activated carbon which can be used in the present invention.

The activated carbon product from the treatment of the lignocellulosic material obtained is then passed through a series of sieves in order to isolate the particle fraction having a particle size in the range of from 200 to 850 μm for use in the present invention. It is particularly preferred to use activated carbon having a particle size in the range of from 200 to 600 μm in the present invention. If significant numbers of particles above or below the specified limits are present, the activity of the electrocatalytic surface will not be sufficiently high for the reduction of sulfur to occur.

Whilst not wishing to be bound by theory, it is believed that the activated carbons used in the present invention show the unexpectedly high catalytic behaviour because of the preferential chemisorption of sulfur or oxygen species on to the surface, possibly by active sites produced during the activation process. The chemisorbed sulfur or oxygen species is then believed to act as an intermediary for a low activation energy reduction process.

The nut shells or fruit stones which may be used to produce the activated carbon are materials such as peach pits, almond stones, olive stones, palm nut shells, coconut shells or babassau.

The activated carbon used in the present invention also has a pore volume of from 0.45 to 1.0 preferably from 0.5 to 0.8, more preferably from 0.6 to 0.7 cm$^3$ of pore per gram of carbon. The porosity is measured by carbon tetrachloride adsorption (for microporosity) and mercury intrusion porosimetry (for meso and macroporosity).

The activated carbon used in the present invention also has a surface area in the range of from 800 to 1500 m$^2$/g, preferably 1000 to 1100 m$^2$/g. The surface area is measured by nitrogen adsorption as described in Porosity in Carbons, edited by John W. Patrick, Edward Arnold, 1995.

The structure which comprises the activated carbon and polymeric binder material has a thickness of at least 1 mm. Preferably the structure is from 2 mm to 5 mm in thickness.

The polymeric binder material may be, for example, polyethylene, particularly high density polyethylene, polypropylene or polyvinylidene fluoride. Preferably the polymeric binder will be used in an amount of up to 20% by weight, although the preferred amount will depend upon the particular binder used. The preferred ranges are thus:

Polyethylene—5 to 15% by weight
Polypropylene—5 to 15% by weight
Polyvinylidene—10 to 20% by weight The electrode comprises an electrode core which is in electrical contact with the structure comprising the activated carbon/polymeric binder. The electrode core may be an electrically conductive carbon polymer composite such as a high density polyethylene compounded with synthetic graphite powder and carbon black.

The structure in electrical contact with the electrode core may be in intimate contact with the core for example by compression molding the activated carbon polymeric binder mixture onto the surface of the electrode or by gluing or by using heat and pressure. Alternatively, the structure may be in electrical contact with the surface of the electrode core via an intermediate member such as an intermediate layer of carbon cloth or paper.

The electrode of the present invention may be a monopolar electrode, or a bipolar electrode in which one or both surfaces is surfaced with a layer comprising the activated carbon/binder mixture as defined above.

The electrode of the present invention may be formed by surfacing a preformed electrically conductive carbon polymer composite electrode core with a mixture of up to 25% by weight, preferably up to 20% by weight, of a polymeric binder material and the said activated carbon. A layer of the mixture is applied onto the surface of a preformed composite polymer electrode core and compression-molded onto the electrode core to form a laminate thereon of the desired thickness.

The compression molding is preferably carried out at a temperature in the range of from 150° to 250° C. and a pressure of from 0.5 to 5 MPa.

The compression moulding is preferably carried out at a temperature in the range of from 150° to 250° C. and a pressure of from 0.5 to 5 MPa.

Alternatively, the activated carbon/polymeric binder may be produced as tiles or sheets by appropriate thermal treatment. The tiles or sheets are then placed into intimate contact with the surface or surfaces of the carbon polymer composite electrode cores, optionally by hot pressing or gluing.

Accordingly, the present invention includes within its scope a method for the fabrication of a carbon based electrode of the invention which method comprises forming a mixture of a particulate activated carbon as defined above with a powdered polymeric binder material in an amount of up to 25% by weight based on the weight of the mixture, feeding the said mixture to a mold or onto a polymeric backing sheet, subjecting the mixture to a heat and pressure in order to form a sheet and either bonding the preformed sheet directly or indirectly to a sheet of a preformed electrically conductive carbon polymer composite electrode core material and then cutting the bonded assembly to the desired size, or cutting the preformed sheet to the desired size to form tiles and placing the preformed tiles directly or indirectly in electrical contact with individual preformed electrically conductive carbon polymer composite electrode cores.

In carrying out this method, an intermediate electrically conductive cloth or paper may be positioned between the preformed sheet or tile and the electrical core. Intimate electrical contact may be obtained for instance by gluing, by the application of heat and pressure or by the in-situ compression effected by the cell construction.

The present invention also includes within its scope an electrochemical apparatus which comprises a single cell or an array of cells, each cell with a positive chamber containing a positive electrode and an electrolyte and a negative chamber containing a negative electrode and an electrolyte, the positive and negative chambers being separated from one another by a cation exchange membrane and the negative electrode being a carbon based electrode of the present invention.

The electrochemical apparatus is preferably an apparatus for energy storage and/or power delivery. The electrolyte in the negative chamber of the electrochemical apparatus preferably contains a sulfide during power delivery, whilst the electrolyte in the positive chamber of the electrochemical apparatus preferably contains bromine, iron, air or oxygen. The sulfide contained in the electrolyte in the negative chamber may be one or more of sodium, potassium, lithium or ammonium sulfide and may preferably be present in a concentration of from 1 to 2M.

The chemical reactions which are involved in these three systems are as follows:

$$Br_2 + S^{2-} \rightleftharpoons 2Br^- + S \tag{1}$$

The above reaction actually occurs in separate but dependent bromine and sulfur reactions, the bromine reaction taking place at the positive electrode and the sulfur reaction at the negative electrode.

$$2Fe^{3+} + S^{2-} \rightleftharpoons 2Fe^{2+} + S \tag{2}$$

Once again, this reaction actually occurs in separate but dependent iron and sulfur reactions, the iron reaction taking place at the positive electrode and the sulfur reaction at the negative electrode.

$$4H_2O + 4S^{2-} + 2O_2 \rightleftharpoons 8OH^- + 4S \tag{3}$$

This reaction also actually occurs in separate but dependent oxygen and sulfur reactions, the oxygen reaction taking place at the positive electrode and the sulfur reaction at the negative electrode.

Preferably the electrodes used in the cell array as described above will be bipolar electrodes, the negative electrode surface of which is a carbon based electrode of the invention. More preferably, however, both surfaces of the bipolar electrodes will be constituted by carbon based electrodes in accordance with the present invention.

Thus, the present invention also includes within its scope the use of a carbon based electrode as defined in a process which comprises the electrochemical reduction of sulphur or oxygen. In particular, the use wherein the process is a process for electrochemical energy storage which comprises the sulfide/polysulfide redox reduction reaction.

The production of a carbon based electrode of the present invention will be further described with reference to the accompanying drawings, in which:

FIG. 1 is a schematic representation of the process for the production of a carbon based electrode.

Referring to the schematic representation of the process for the production of a carbon based electrode as shown in FIG. 1, the production of the electrode core is depicted in schematic fashion on the left hand side of the drawing, with the production of the electrocatalytically active tile being depicted on the right hand side of the drawing.

In step 1 of the process for forming the electrode core a high density polyethylene was compounded with a synthetic graphite powder and carbon black to form a polymeric material having a resistivity of less than 0.3 ohm cm. This mixture was then extruded in step 2 of the process to form a sheet of the said polymeric material from 1 to 5 mm in thickness. The sheet was then cut to the desired size in step 3.

In the process for forming the electro-catalytically active tile the fraction of an activated carbon from Sutcliffe Speakman Carbons Ltd. 207C which passed through a 70 mesh sieve but which was retained on a 30 mesh sieve was mixed (step 4) with powdered polyethylene, polypropylene or polyvinylidene fluoride at a level not exceeding 25% by weight. In step 5 the powder mixture is fed onto a polymer backing (PET) film by means of a hopper and levelled with a screen and rollers. The film is passed under an infra-red heater array. Heat from the infra-red heaters is adsorbed by the activated carbon and conducted through the structure which causes the polymer to melt but does not degrade it. The composite (powder mix/backing film) is then passed through heated rollers to flatten and compress the mixture to form an electrocatalytic sheet. The sheet is then cut to the desired size component in step 6.

An electrode is then formed in step 7 by bonding the electrocatalytically active component (with the backing sheet removed) to the electrode core component by placing the electrocatalytically active component in a compression mold tool heated to about 50° C. placing the electrode core component on top heating the electrode core component to about 250° C. using an infra-red heating panel and placing a second electrocatalytically active component over the electrode core component. The components are bonded together by applying a pressure of 4 to 25 MPa to the composite using a piston. Both electrocatalytically active sheets become bonded to the electrode core. The component is then allowed to cool.

The present invention will be further described with reference to the following Examples.

In the Examples, the following measurement techniques were used.

Overvoltage

The overvoltages were measured in a standard monopolar redox flow cell equipped with platinum reference electrodes. The results are given for a 1.3M $Na_2S_4$ solution with balancing salts. The overvoltage is an average value measured throughout the charging (reduction) period.

Porosity

The pore volume is measured by carbon tetrachloride adsorption (for microscopy) and mercury intrusion porosimetry (meso and macroporosity) as described in Porosity in Carbons, edited by John W. Patrick, Edward Arnold, 1995.

Surface Area

Surface area is measured by the nitrogen adsorption isotherm method as described in Porosity in Carbons edited by John W. Patrick, Edward Arnold, 1995.

EXAMPLE 1

An electrically conductive carbon polymer composite electrode (CPE) was prepared from 50% by weight synthetic graphite and 50% by weight Kynar 6000LD polyvinylidene fluoride powder (Elf Atochem) molded at a temperature of 210° C. and a pressure of 4.5 MPa. The CPE was surfaced with a mixture of 14.3% by weight of a powdered polyvinylidene fluoride binder (Kynar 6000LD—Elf Atochem) and 85.7% by weight of carbon particles having a particle size in the range of from 212 to 600 µm (30 to 70 mesh—US Standard Sieve Series) prepared by sieving an activated carbon sold by Sutcliffe Speakman Carbons Limited as 207C. The activated carbon had a surface area of 1100 $m^2/g$ and a pore volume of 0.65 cm3 per gram. The 207C/binder mixture was compression molding onto the CPE at 210° C. at a pressure of 1.25 MPa to form a laminate. Various electrodes with different surface laminate thicknesses were prepared by this technique.

The electrodes were each incorporated onto a monopolar cell as the negative electrode thereof. The positive electrode was of the same construction. The electrodes were separated by a cation exchange membrane. The electrolyte in the negative compartment of the cell was 1M $Na_2S_4$ and the electrolyte in the positive compartment of the cell was 1M bromine in 5M NaBr.

The results for the overvoltage for sulfur reduction are given in Table 1:

| Structure (Thickness of activated carbon layer) | Overvoltage for sulfur reduction at 40 MA $cm^{-2}$ Mv |
|---|---|
| <1 mm thick | 800 |
| 2.0 mm thick | 57 |
| 3.0 mm thick | 40 |
| 4.0 mm thick | 43 |
| 2.0 mm thick - powder with fines | 740 |
| Ni surfaced electrode | 550 |

EXAMPLE 2

An activated carbon/polyvinylidene fluoride mixture was prepared according to Example 1. The powder mix was compression molded into an electrocatalytic carbon tile of various thicknesses at 210° C. at a pressure of 1.25 MPa. The tile was then contacted to an electrically conducting core by positioning a sheet of electrically conducting carbon cloth, paper or felt between the tile and the core by mechanical compression on assembly of a monopolar cell incorporating the electrodes.

The monopolar cell was as described in Example 1 and the overvoltages for sulfur reduction are given in Table 2.

| Structure (Thickness of activated carbon layer) | Overvoltage for sulfur reductions @ 40 mA $cm^{-2}$ |
|---|---|
| 2.0 mm thick | 45 mV |
| 3.5 mm thick | 52 mV |
| 2.0 mm thick no carbon cloth interlayer | 660 mV |

EXAMPLE 3

An activated carbon/polyvinylidene fluoride tile was formed according to Example 2. The tile was then bonded to the electrically conducting core by resistive welding of the tile to form a laminate structure. For the reduction of sulfur at 40 mA $cm^{-2}$ the overvoltage was 75 mV.

EXAMPLE 4

A laminate was prepared according to Example 1 with the activated carbon powder being bonded to both sides of the substrate sheet to form a bipolar electrode. This electrode was then incorporated into a bipolar cell configuration and operated with electrolytes as detailed in Example 1. For the reduction of sulfur at 40 mA $cm^{-2}$ the overvoltage was 70 mV.

What is claimed is:

1. A carbon based electrode for the electrochemical reduction of sulfur or oxygen, which comprises an electrode core and, in electrical contact therewith, a structure comprising a porous particulate activated carbon bonded with a polymeric binder material, characterised in that the structure is at least 1 mm thick, in that the particulate activated carbon is prepared from a lignocellulosic material and has the following properties:

i) a particle size in the range of from 200 to 850 $\mu$m;

ii) a pore volume of from 0.45 to 1.0 $cm^3$ per gram;

iii) a surface area in the range of from 800 to 1500 $m^2/g$;

and in that the binder is used in an amount not exceeding 25% by weight based upon the mixture of activated carbon and binder material.

2. An electrode as claimed in claim 1 wherein the activated carbon has a particle size in the range of from 200 to 600 $\mu$m.

3. An electrode as claimed in claim 1 wherein the activated carbon has a pore volume of from 0.6 to 0.7 $cm^3$ per gram.

4. An electrode as claimed in claim 1 wherein the activated carbon has a surface area in the range of from 1000 to 1100 $m^2/g$.

5. An electrode as claimed in claim 1 wherein said structure is in the form of a surface layer on said electrode core and wherein said surface layer is from 2 to 5 mm in thickness.

6. An electrode as claimed in any one of the preceding claims wherein the polymeric binder material is polyethylene, polypropylene or polyvinylidene fluoride.

7. An electrode as claimed in claim 1 wherein the binder is used in an amount of up to 20% by weight.

8. An electrode as claimed in claim 7 wherein the binder is high density polyethylene which is used in an amount of from 5 to 15% by weight.

9. An electrode as claimed in claim 7 wherein the binder is polyvinylidene fluoride which is used in an amount of from 10 to 20% by weight.

10. An electrode as claimed in claim 7 wherein the binder is polypropylene which is used in an amount of from 5 to 15% by weight.

11. An electrode as claimed in claim 1 which comprises an electrically conductive carbon polymer composite core to which the layer of activated carbon bonded with a polymeric binder is directly bonded.

12. An electrode as claimed in claim 11 wherein the composite core comprises high density polyethylene compounded with synthetic graphite powder and carbon black.

13. An electrode as claimed in claim 1 which is a bipolar electrode.

14. An electrode as claimed in claim 13 wherein each surface of the bipolar electrode comprises a surface layer at least 1 mm thick of said particulate activated carbon bonded with a polymeric binder material.

15. A method for the fabrication of a carbon based electrode as claimed in claim 1, which method comprises forming a mixture of said particulate activated carbon with a powdered polymeric binder material in an amount of up to 25% by weight based on the weight of the mixture, applying a layer of the said mixture to the surface of a preformed electrically conductive carbon polymer composite electrode core and compression molding the said mixture onto the electrode core in order to form a laminate thereon of a desired thickness.

16. A method as claimed in claim 15 wherein the compression molding is carried out at a temperature in the range of from 150° to 250° C. and a pressure of from 0.5 to 5.0 MPa.

17. A method for the fabrication of a carbon based electrode as claimed in claim 1, which method comprises forming a mixture of said particulate activated carbon with a powdered polymeric binder material in an amount of up to 25% by weight based on the weight of the mixture, feeding the said mixture to a mold or onto a polymeric backing sheet, subjecting the mixture to heat and pressure in order to form a sheet and either bonding the preformed sheet directly or indirectly to a sheet of a preformed electrically conductive carbon polymer composite electrode core material and then cutting the bonded assembly to a desired size, or cutting the preformed sheet to a desired size to form tiles and placing the preformed tiles directly or indirectly in electrical contact with individual preformed electrically conductive carbon polymer composite electrode cores.

18. A method for the fabrication of a carbon based electrode, which method comprises forming a mixture of particulate activated carbon, the particulate activated carbon being prepared from a lignocellulosic material and having the following properties i) a particle size in the range of from 200 to 850 $\mu$m;

ii) a pore volume of from 0.45 to 1.0 $cm^3$ per gram;

iii) a surface area in the range of from 800 to 1500 $m^2/g$;

with a powdered polymeric binder material in an amount of up to 25% by weight based on the weight of the mixture, feeding the said mixture to a mold or onto a polymeric backing sheet, subjecting the mixture to heat and pressure in order to form a sheet and either bonding the preformed sheet indirectly to a sheet of a preformed electrically conductive carbon polymer composite electrode core material and then cutting the bonded assembly to a desired size, or cutting the preformed sheet to a desired size to form tiles and placing the preformed tiles indirectly in electrical contact with individual preformed electrically conductive carbon polymer composite electrode cores, wherein an intermediate electrical cloth is positioned between the preformed sheet or tile and the electrode core.

19. A method as claimed in claim 17 wherein the preformed sheet is bonded to the preformed electrically conductive carbon polymer composite electrode core material by the application of heat and pressure.

20. An electrochemical apparatus which comprises a single cell or an array of cells, each cell with a positive chamber containing a positive electrode and an electrolyte and a negative chamber containing a negative electrode and an electrolyte, the positive and negative chambers being separated from one another by a cation exchange membrane and the negative electrode being a carbon based electrode that comprises an electrode core and, in electrical contact therewith, a structure comprising a porous particulate activated carbon bonded with a polymeric binder material, characterised in that the structure is at least 1 mm thick, in that the particulate activated carbon is prepared from a lignocellulosic material and has the following properties i) a particle size in the range of from 200 to 850 $\mu$m;

ii) a pore volume of from 0.45 to 1.0 $cm^3$ per gram;

iii) a surface area in the range of from 800 to 1500 $m^2/g$;

and in that the binder is used in an amount not exceeding 25% by weight based upon the mixture of activated carbon and binder material.

21. An electrochemical apparatus as claimed in claim 20 which is an apparatus for energy storage and/or power delivery.

22. A process for the electrochemical reduction of sulfur or oxygen, the process comprising the step of providing an electrochemical apparatus and electrolytes for the electrochemical reduction of sulfur or oxygen wherein at least one electrode of the electrochemical apparatus is a carbon based electrode that comprises an electrode core and, in electrical contact therewith, a structure comprising a porous particulate activated carbon bonded with a polymeric binder material, characterised in that the structure is at least 1 mm thick, in that the particulate activated carbon is prepared from a lignocellulosic material and has the following properties i) a particle size in the range of from 200 to 850 $\mu$m;
ii) a pore volume of from 0.45 to 1.0 $cm^3$ per gram;
iii) a surface area in the range of from 800 to 1500 $m^2/g$;

and in that the binder is used in an amount not exceeding 25% by weight based upon the mixture of activated carbon and binder material.

23. The process of claim 22 wherein the process is a process for electrochemical energy storage which comprises the sulfide/polysulfide redox reduction reaction.

* * * * *